US012552167B2

(12) United States Patent
Nishioka et al.

(10) Patent No.: US 12,552,167 B2
(45) Date of Patent: Feb. 17, 2026

(54) PRINTING APPARATUS, CONTROL METHOD, AND STORAGE MEDIUM

(71) Applicant: CANON KABUSHIKI KAISHA, Tokyo (JP)

(72) Inventors: Shingo Nishioka, Kanagawa (JP); Takayoshi Kikuchi, Kanagawa (JP); Hajime Nagai, Kanagawa (JP); Shin Genta, Kanagawa (JP); Ayumi Yasuda, Kanagawa (JP); Keiji Kuriyama, Saitama (JP); Serena Yoshikawa, Kanagawa (JP); Satoshi Wada, Tokyo (JP); Fumihiro Goto, Kanagawa (JP); Daisuke Yoshitoku, Kanagawa (JP); Naoko Baba, Kanagawa (JP); Hiroshi Kawafuji, Tokyo (JP); Yoshiyuki Honda, Kanagawa (JP); Akihiro Mouri, Tokyo (JP); Shunsuke Kakei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 18/538,324

(22) Filed: Dec. 13, 2023

(65) Prior Publication Data

US 2024/0198676 A1 Jun. 20, 2024

(30) Foreign Application Priority Data

Dec. 20, 2022 (JP) ................................. 2022-203744

(51) Int. Cl.

| | |
|---|---|
| ***B41J 2/15*** | (2006.01) |
| ***B41J 2/21*** | (2006.01) |
| ***B41J 3/62*** | (2006.01) |

(52) U.S. Cl.

CPC . *B41J 2/15* (2013.01); *B41J 2/21* (2013.01); *B41J 3/62* (2013.01)

(58) Field of Classification Search

CPC ......... B41J 2/15; B41J 2/21; B41J 3/62; B41J 2/2114; B41J 2/2117

(Continued)

(56) References Cited

U.S. PATENT DOCUMENTS

| | | |
|---|---|---|
| 7,237,871 B2 | 7/2007 | Yamaguchi |
| 7,278,700 B2 | 10/2007 | Yamaguchi |

(Continued)

FOREIGN PATENT DOCUMENTS

| | | |
|---|---|---|
| JP | 2020-049783 A | 4/2020 |

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes a printing-medium conveyance unit, a printhead, and a control unit. The printhead has a first array of ejection ports ejecting a first ink and a second array of ejection ports ejecting a second ink, with the ports arranged in a printing-medium conveyance direction and the arrays arranged in a predetermined direction intersecting the conveyance direction. The control unit performs control to print an image of a foundation layer and images in stack and non-stack regions on the printing medium by having the conveyance unit convey the printing medium while scanning the printhead. The control unit performs control so that in printing in the non-stack region, the image of the foundation layer is printed using an ejection-port group in the first array at the same position as an ejection-port group in the second array for printing the image in the non-stack region, in an ejection-port arrangement direction.

13 Claims, 14 Drawing Sheets

(58) Field of Classification Search
USPC .............................................................. 347/5
See application file for complete search history.

(56) References Cited

U.S. PATENT DOCUMENTS

| | | | |
|---|---|---|---|
| 7,281,780 | B2 | 10/2007 | Nagamura |
| 7,347,519 | B2 | 3/2008 | Nagamura |
| 7,380,896 | B2 | 6/2008 | Wada |
| 7,399,049 | B2 | 7/2008 | Jahana |
| 7,419,257 | B2 | 9/2008 | Mouri |
| 7,431,426 | B2 | 10/2008 | Yamaguchi |
| 7,494,213 | B2 | 2/2009 | Taniuchi |
| 7,517,044 | B2 | 4/2009 | Suzuki |
| 7,533,954 | B2 | 5/2009 | Nakazawa |
| 7,552,996 | B2 | 6/2009 | Ochiai |
| 7,585,039 | B2 | 9/2009 | Ochiai |
| 7,726,763 | B2 | 6/2010 | Ochiai |
| 7,773,244 | B2 | 8/2010 | Yano |
| 7,775,622 | B2 | 8/2010 | Suzuki |
| 7,789,476 | B2 | 9/2010 | Tomida |
| 7,798,593 | B2 | 9/2010 | Nitta |
| 7,880,910 | B2 | 2/2011 | Aichi |
| 7,891,754 | B2 | 2/2011 | Nagamura |
| 7,926,933 | B2 | 4/2011 | Taniuchi |
| 7,963,623 | B2 | 6/2011 | Ochiai |
| 7,980,652 | B2 | 7/2011 | Baba |
| 7,997,717 | B2 | 8/2011 | Taniuchi |
| 8,174,711 | B2 | 5/2012 | Yano |
| 8,210,638 | B2 | 7/2012 | Wada |
| 8,240,795 | B2 | 8/2012 | Baba |
| 8,454,110 | B2 | 6/2013 | Ochiai |
| 8,608,277 | B2 | 12/2013 | Tomida |
| 8,622,501 | B2 | 1/2014 | Komamiya |
| 8,636,334 | B2 | 1/2014 | Nishioka |
| 8,733,874 | B2 | 5/2014 | Baba |
| 8,740,333 | B2 | 6/2014 | Teshigawara |
| 8,931,869 | B2 | 1/2015 | Kawafuji |
| 8,931,875 | B2 | 1/2015 | Kosaka |
| 9,039,120 | B2 | 5/2015 | Nishioka |
| 9,044,947 | B2 | 6/2015 | Wada |
| 9,211,748 | B2 | 12/2015 | Baba |
| 9,308,741 | B2 | 4/2016 | Wada |
| 9,340,050 | B2 | 5/2016 | Otani |
| 9,415,602 | B2 | 8/2016 | Takeuchi |
| 9,636,906 | B2 | 5/2017 | Kawatoko |
| 9,656,459 | B2 | 5/2017 | Kuwabara |
| 9,764,562 | B2 | 9/2017 | Suzuki |
| 9,889,649 | B2 | 2/2018 | Baba |
| 10,137,690 | B2 | 11/2018 | Hirokawa |
| 10,166,763 | B2 | 1/2019 | Honda |
| 10,384,470 | B2 | 8/2019 | Yamane |
| 10,457,076 | B2 | 10/2019 | Inoue |
| 10,471,750 | B2 | 11/2019 | Hirokawa |
| 10,500,841 | B2 | 12/2019 | Nishitani |
| 10,513,119 | B2 | 12/2019 | Inoue |
| 10,543,679 | B2 | 1/2020 | Masuda |
| 10,556,448 | B2 | 2/2020 | Ohnishi |
| 10,569,580 | B2 | 2/2020 | Deguchi |
| 10,632,765 | B2 | 4/2020 | Takeuchi |
| 10,668,717 | B2 | 6/2020 | Azuma |
| 10,723,122 | B2 | 7/2020 | Hirokawa |
| 10,730,285 | B2 | 8/2020 | Sakamoto |
| 10,759,193 | B2 | 9/2020 | Goto |
| 11,001,074 | B2 | 5/2021 | Okuda |
| 11,077,687 | B2 | 8/2021 | Nishioka |
| 11,292,268 | B2 | 4/2022 | Kawafuji |
| 11,383,536 | B2 | 7/2022 | Genta |
| 11,429,050 | B2 | 8/2022 | Baba |
| 11,794,495 | B2 | 10/2023 | Kato |
| 11,813,853 | B2 | 11/2023 | Kawafuji |
| 11,840,079 | B2 | 12/2023 | Kuriyama |
| 11,840,101 | B2 | 12/2023 | Ushiyama |
| 11,919,300 | B2 | 3/2024 | Kawafuji |
| 2010/0253724 | A1* | 10/2010 | Matsuzawa ............ B41J 2/2117 347/43 |
| 2020/0101758 | A1 | 4/2020 | Okuda |
| 2021/0402813 | A1 | 12/2021 | Murase |
| 2022/0324223 | A1 | 10/2022 | Nagai |
| 2023/0001721 | A1 | 1/2023 | Kanda |
| 2023/0191798 | A1 | 6/2023 | Nitta |
| 2023/0202193 | A1 | 6/2023 | Yamamuro |

* cited by examiner

PRINTING APPARATUS, CONTROL METHOD, AND STORAGE MEDIUM

BACKGROUND OF THE INVENTION

Field of the Invention

The present disclosure relates to a printing apparatus, a control method, and a storage medium.

Description of the Related Art

A technique of this kind is used in, for example, the industrial printing field. In this field, there are demands for printing on a colored printing medium and a transparent printing medium. In this event, from the perspective of controlling the color reproduction of a color image printed and the transparency of a printing medium, a foundation layer is printed on the printing medium, and the color image is printed thereon.

In a case where such a stack of images are printed by scanning a printhead a plurality of times, in order to perform printing consecutively while reducing mixing between the foundation layer and the color image, the foundation layer and the color image are printed so as not to overlap with each other in a single scan. In a technique described in Japanese Patent Laid-Open No. 2020-49783, from ejection port arrays each having ejection ports arranged in the printing medium conveyance direction, an ejection port group of ejection ports that eject ink for printing a foundation layer and an ejection port group of ejection ports that eject ink for printing a color image are selectively used so as not to overlap with each other in the scanning direction.

However, such selective use of ejection port groups may lead to inequality in the times of usage (ejection) among ejection ports in an ejection port array. Thus, ejection ports that are used more than others reach their limit of serviceability faster than the others, which consequently shortens the life of the printhead.

SUMMARY OF THE INVENTION

A printing apparatus according to an aspect of the present disclosure includes: a conveyance unit configured to convey a printing medium; a printing unit having a first ejection port array in which a plurality of ejection ports for ejecting a first ink are arranged in a conveyance direction in which the printing medium is conveyed and a second ejection port array in which a plurality of ejection ports for ejecting a second ink different from the first ink are arranged in the conveyance direction, the first ejection port array and the second ejection port array being arranged in a predetermined direction intersecting with the conveyance direction, the printing unit being configured to print an image by scanning relative to the printing medium in a direction along the predetermined direction; and a control unit configured to perform control to print an image of a foundation layer, an image in a stack region, and an image in a non-stack region on the printing medium by causing the conveyance unit to convey the printing medium while causing the printing unit to perform the scanning. In the printing unit, an ejection port group in the first ejection port array used to print the image of the foundation layer, an ejection port group in the second ejection port array used to print the image in the stack region stacked on the foundation layer, and an ejection port group in the second ejection port array used to print the image in the non-stack region not stacked on the foundation layer are set. The control unit performs control so that in printing of the image in the non-stack region, the image of the foundation layer is printed using an ejection port group in the first ejection port array which is located at a same position as an ejection port group in the second ejection port array for printing the image in the non-stack region, in a direction in which the ejection ports of the first ejection port array are arranged.

Further features of the present invention will become apparent from the following description of exemplary embodiments with reference to the attached drawings.

DESCRIPTION OF THE EMBODIMENTS

Embodiments of the present disclosure are described in detail below with reference to the drawings.

First Embodiment

<Apparatus Configuration>

Figure 1:
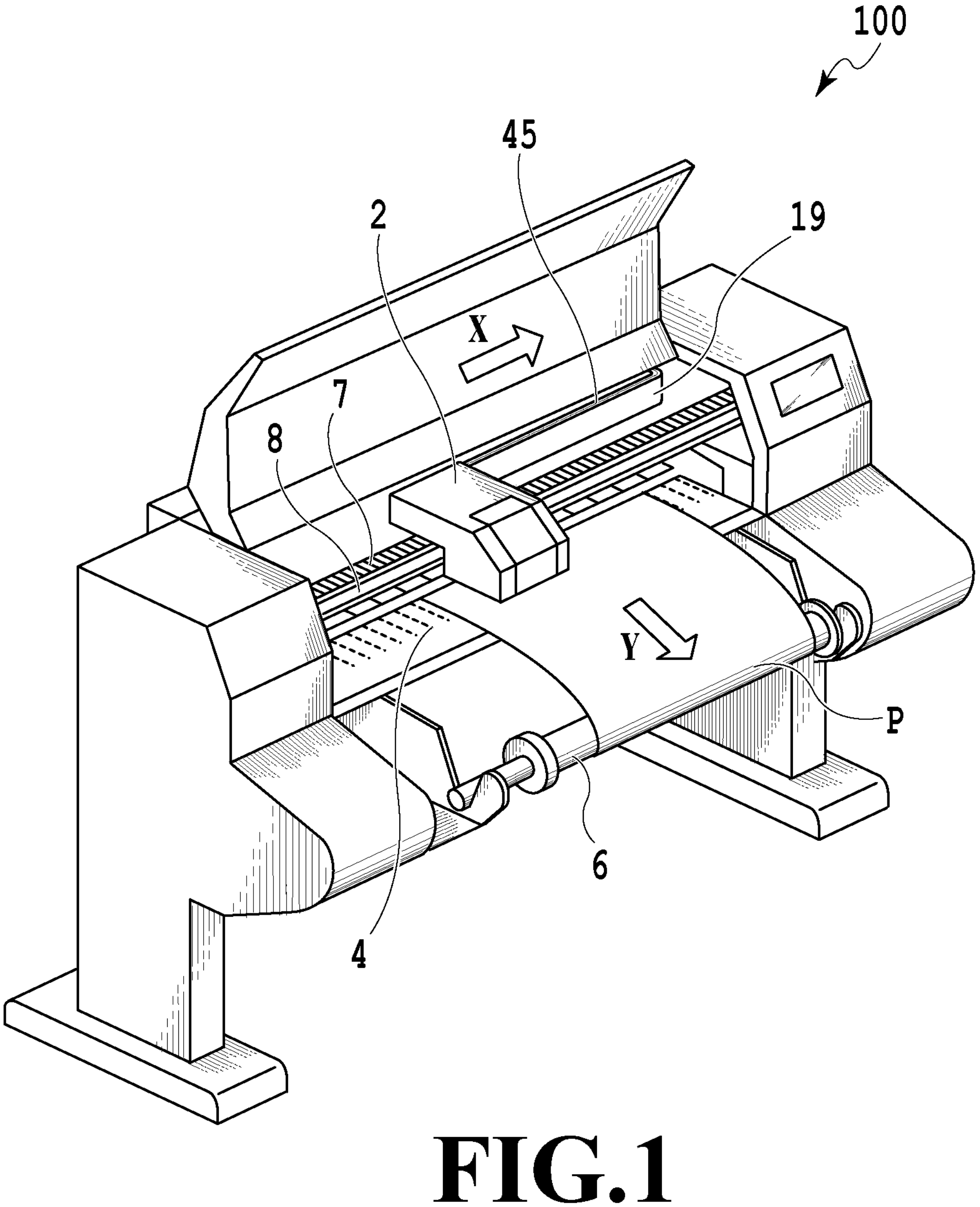
FIG. 1 is a perspective view showing a printing apparatus.

FIG. 1 is a perspective view showing a printing apparatus according to one embodiment of the present disclosure. A printing apparatus 100 according to the present embodiment employs a serial-type printing method and prints an image by scanning a printhead in a direction (the arrowed X-direction in FIG. 1) intersecting with the direction in which a printing medium P is conveyed (the arrowed Y-direction in FIG. 1).

The printing medium P is in a roll shape wound around a spool (not shown) and is fed by being unwound from the roll. The printing medium P thus fed travels along a conveyance route (not shown) from the farther side of the printing apparatus in FIG. 1 and is conveyed in the Y-direction under the printhead's scan region. Then, as the printing is performed, a printed portion of the printing medium P is conveyed frontwards of the printing apparatus and is would around a winding spool 6. This conveyance of the printing medium P is performed by driving and rotation of a conveyance roller (not shown) provided on a conveyance route. A printhead 9 (see FIG. 2) is detachably mounted to a lower portion of a carriage unit 2. Then, as driven by a carriage motor (not shown), the carriage unit 2 can move along a guide shaft 8 extending in the X-direction. In this way, the printhead can scan in the X-direction (+X-directions) relative to the printing medium P. The printing medium P conveyed through the printhead's scan region by the conveyance unit is supported on its back surface by a platen 4, and the print surface of the printing medium is thus restricted to be flat.

In the scanning by the printhead, the printhead ejects ink at a timing based on a position signal from an encoder 7 and performs printing within a band width corresponding to the arrangement range of ejection ports at the printhead. The printhead of the present embodiment includes electrothermal conversion elements as printing elements for the respective ejection ports for ejecting ink. These elements generate heat energy by being driven, and this heat produces an air bubble in ink. Then, the pressure of the air bubble causes the ink to be ejected. Note that elements usable as the printing elements besides the electrothermal conversion elements include piezoelectric elements, electrostatic elements, and MEMS elements. Scanning speed is variable, and scanning can be done 10 inches to 70 inches per second. Printing resolution is also variable, and the ejection operation can be done at 300 dpi to 2400 dpi. In the present embodiment, (pixel) printing is performed at a resolution of 1200 dpi. After the scanning described above, the printing medium P is conveyed by a predetermined amount to be printed on a region of the next band width.

Note that a carriage belt can be used to transmit driving power from the carriage motor to the carriage unit 2. However, a different driving method can be used instead of a carriage belt. Examples of the different driving method include using a mechanism having a lead screw which extends in the X-direction and is driven and rotated by a carriage motor and an engagement part which is provided at the carriage unit 2 and engages with a groove in the lead screw. Also, a heating unit is provided to heat and dry ink on the printing medium P which has undergone the printing operation. Further, a drying mechanism is provided to dry a printed image during printing and scanning. The temperature and wind speed for this drying mechanism can be set freely and are not limited to particular values. After being printed on by the printhead to be described in more detail later, the printing medium P is wound around the winding spool 6 and is formed into a roll-shaped wound medium.

Figure 2:
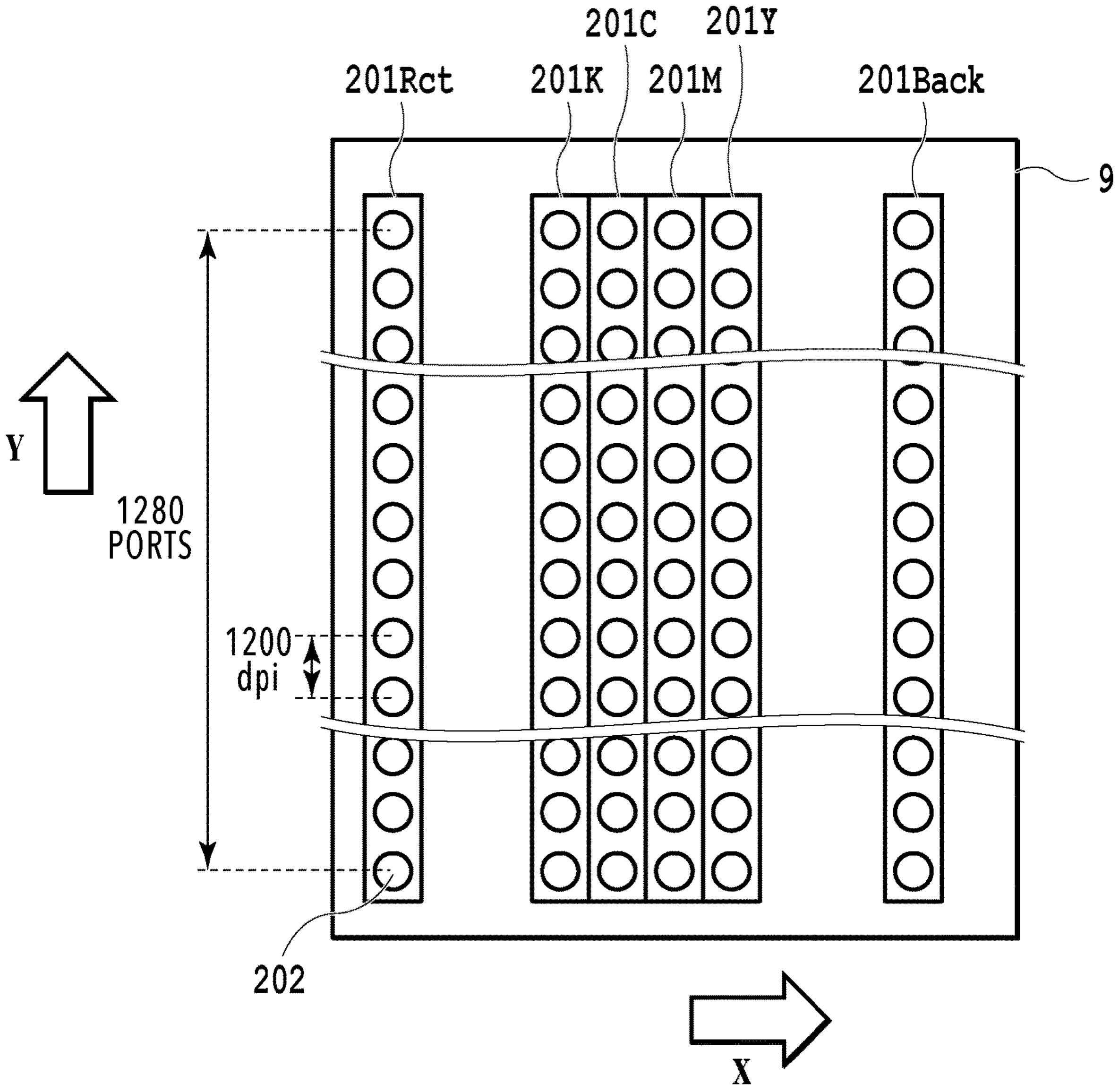
FIG. 2 is a diagram schematically showing an ejection port face of a printhead.

FIG. 2 is a diagram schematically showing the ejection port face of the printhead 9. The printhead 9 of the present embodiment has ejection port arrays 201Rct, 201K, 201C, 201M, 201Y, and 201Back for a reaction liquid, black ink (K), cyan ink (C), magenta ink (M), yellow ink (Y), and a foundation ink (Back), respectively. Each ejection port array 201 has 1280 ejection ports 202 at a density of 1200 dpi. In a state where the printhead 9 is mounted to the carriage unit 2, the ejection port arrays 201 each have ejection ports arranged in the Y-direction shown in FIG. 1, and the six ejection port arrays are arranged in the X-direction (a predetermined direction).

The reaction liquid reacts with a color material or the like in each of the above-described inks to promote their coagulation. Especially in cases of a low-permeable printing medium and an impermeable printing medium to be described later, a contact between a reaction liquid and an ink on a printing medium promotes increase in viscosity due to coagulation of a color material. As a result, an image with less beading can be favorably printed. Also, a reaction liquid can react also with a solid content in the foundation ink and increase the viscosity. Although the same reaction liquid is used in the present embodiment to react with the color ink and the foundation ink, different reaction liquids may be used for the color ink and the foundation ink. In that case, another reaction-liquid ejection port array is added.

Liquid storage tanks (not shown) for storing the inks and the reaction liquid described above are provided corresponding to the respective ejection port arrays, and the inks and the like are supplied from these liquid storage tanks. Note that the printhead and the ink tanks used in the present embodiment may be configured integrally or separably.

Figure 3:
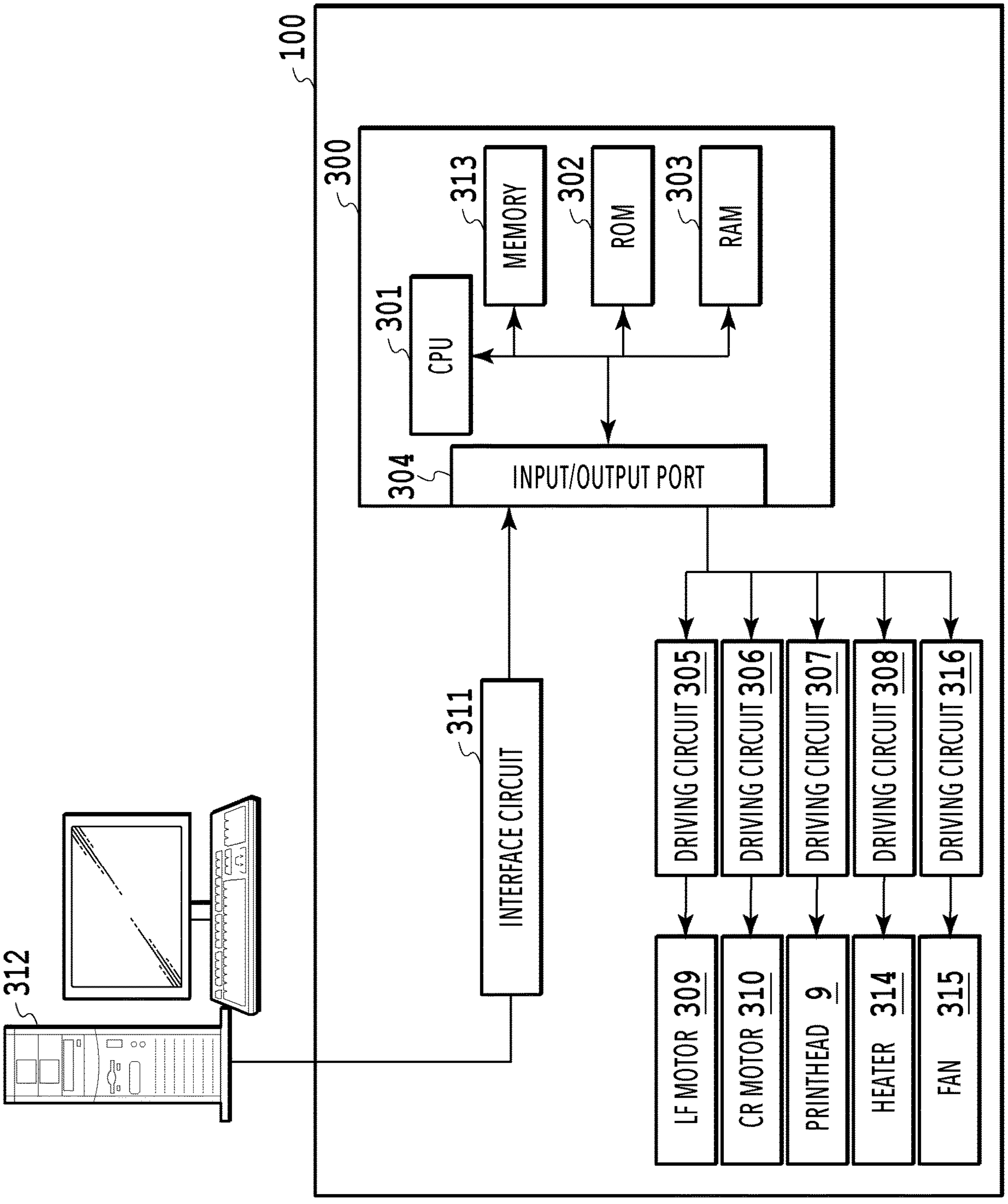
FIG. 3 is a block diagram showing the configuration of a control system of the printing apparatus.

FIG. 3 is a block diagram showing the configuration of a control system of the printing apparatus 100 according to the present embodiment. A main control unit 300 includes a CPU 301 that executes printing operations and processing operations such as computation, selection, determination, and control. The main control unit 300 also includes a ROM 302 that stores, e.g., control programs to be executed by the CPU 301, a RAM 303 used as, e.g., a buffer for print data, a memory 313, an input/output port 304, and the like. The memory 313 stores, e.g., mask patterns to be described later. Then, driving circuits 305, 306, 307, 308, and 316 are connected to the input/output port 304. Each of the driving circuits controls driving of actuators and like for a conveyance motor (LF motor) 309, a carriage motor (CR motor) 310, the printhead 9, a heater 314, a fan 315, and a cutting unit. Further, the main control unit 300 is connected to a PC 312, which is a host computer, via an interface circuit 311.

<Data Processing>

Figure 4:
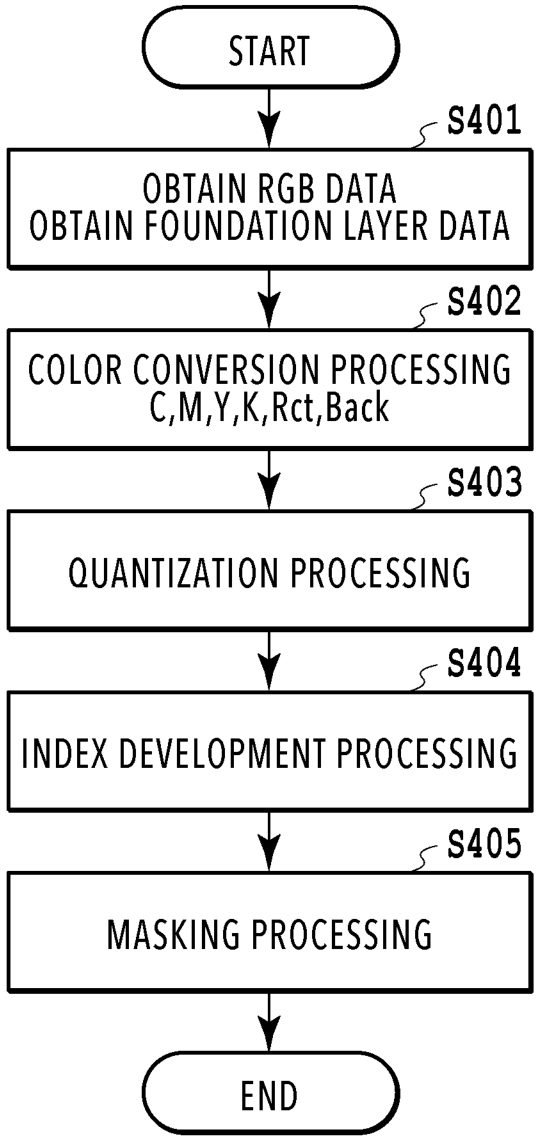
FIG. 4 is a flowchart showing print data generation processing.

FIG. 4 is a flowchart showing print data generation processing according to the present embodiment executed by the CPU 301 in accordance with the control programs.

First, in S401, the CPU 301 obtains image data (brightness data) sent from the PC 312 (a host computer) to the printing apparatus 100, the image data being expressed by 8-bit 256-value information (0 to 255) on each of red (R), green (G), and blue (B). Similarly, as to the foundation ink, the CPU 301 obtains foundation layer data expressed by 8-bit 256-value information. Note that a region to form the foundation layer on a printing medium can be defined in correspondence to a color image to be stacked, determined by a user of the apparatus, or determined by printing conditions.

Next, in S402, the CPU 301 executes color conversion processing to convert RGB image data into CMYK data corresponding to the color inks. This color conversion processing generates CMYK data such that each of C, M, Y, and K is expressed by 12-bit 4096-value information. The CPU 301 similarly executes color conversion processing for the foundation layer data. Also, in S402, the CPU 301 generates reaction liquid data corresponding to the CMYK data and the foundation layer data obtained by the color conversion processing. For example, tone values of the reaction liquid data are set to be 20% of the tone values of each set of the data.

Next, in S403, the CPU 301 quantizes the CMYK data to generate quantized data such that C, M, Y, and K are each expressed by 3-bit 5-value data. The quantization processing can be executed using the dithering method, the error diffusion method, or the like. The CPU 301 performs quantization processing similarly on the foundation layer data and the reaction liquid data to generate 3-bit 5-value data. Note that in the present embodiment, quantization data having a data resolution of 600 dpi is generated by the quantization processing. Next, in S404, the CPU 301 performs index development processing using development pattern data that uses the above quantized data as indices and thereby converts each of C, M, Y, and K into 1-bit binary print data. The CPU 301 performs the index development processing on the foundation layer data and the reaction liquid data as well to convert them into 1-bit binary data. For example, the 3-bit 5-value data to serve as an index is associated with one of five index patterns each with 4×4 cells and can express five tones depending on arrangement of “1” or “0” in the 4×4 cells. Also, because 3-bit 5-value data is at a resolution of 600 dpi, the index-developed pattern of 4×4 cells becomes binary data at a resolution of 1200 dpi to be the print data to be described below.

Lastly, in S405, the CPU 301 performs masking processing corresponding to multi-pass printing to be described later on the color ink print data, the foundation layer print data, and the reaction liquid print data obtained in S404 and thereby generates 1-bit print data for each ejection port array for each scan.

The printhead ejects ink according to the print data generated as above. Although the CPU 301 of the printing apparatus 100 executes all the processes in S401 to S405 in the mode described in the present embodiment, it is to be noted that the present disclosure is not limited to this mode. For example, the PC 312 may execute all the processes in S401 to S405. Also, for example, the PC 312 may execute part of the processes, and the printing apparatus 100 may execute the rest of the processes.

<Multi-Pass Printing>

Figure 5:
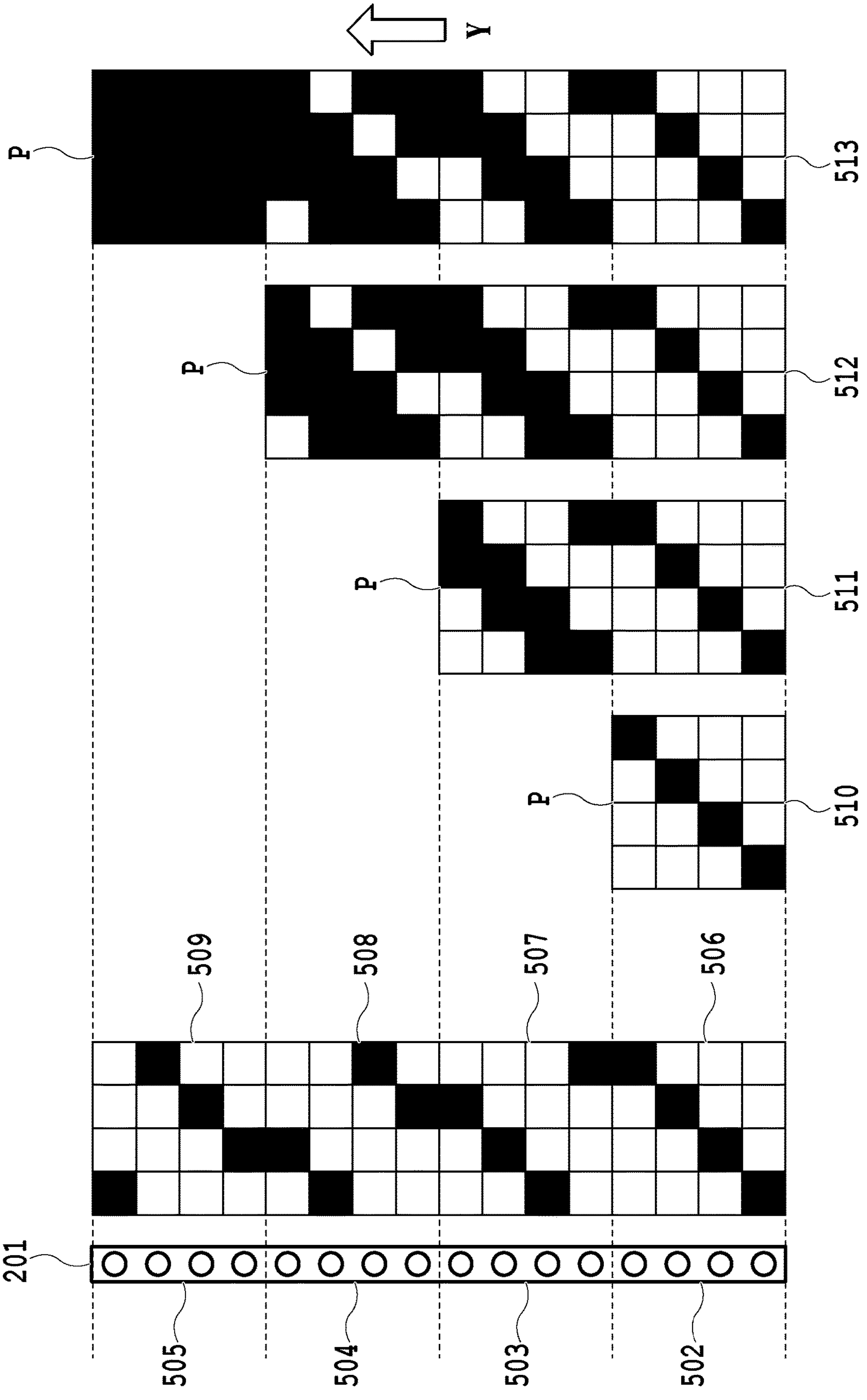
FIG. 5 is a diagram illustrating a multi-pass printing method.

FIG. 5 is a diagram illustrating a multi-pass printing method according to the present embodiment. Multi-pass printing is a method which completes printing on a unit region on a printing medium by scanning the printhead 9 a plurality of times over the unit region while conveying the printing medium by an amount corresponding to the unit region. FIG. 5 shows multi-pass printing with four passes that completes printing on a unit region by scanning the printhead four times. For simplification of illustration, the ejection port array 201 shown in FIG. 5 is formed by 16 ejection ports.

In four-pass printing, the 16 ejection ports are divided into first to fourth ejection port groups 502 to 505 each having four ejection ports. Then, the first to fourth ejection port groups are associated with first to fourth mask patterns (mask regions) 506 to 509, respectively. Each mask pattern has a region of four areas×four areas. An area in black denotes an area where printing of a dot is permitted, while an area in white denotes an area where printing of a dot is not permitted. The first to fourth mask patterns are in a complementary relation with one another and complete an image on a unit region corresponding to a single ejection port group. To simplify the illustration, patterns 510, 511, 512, and 513 show images printed on the printing medium P by the first to fourth scans of the printhead in a case where the print-permitted areas of the mask patterns are all printed. It goes without saying that in actuality, an image is printed based on logical ANDs between the areas of the mask patterns and the print data.

After every scan of the printhead, the printing medium P is conveyed in the Y-direction relative to the ejection port array on the printhead by an amount corresponding to the above-described unit region. First, in the first scan, the pattern 510 is printed on the printing medium P by ejection from the ejection port group 502 corresponding to the mask 506. Next, in the second scan, the pattern 511 is printed on the printing medium P by ejection from the ejection port group 502 corresponding to the mask 506 and ejection from the ejection port group 503 corresponding to the mask 507. Printing is performed similarly afterwards, so that the pattern 513 is printed on the printing medium P with four scans, and printing on a unit region corresponding to the ejection port group 505 is thus completed.

<Inks>

The color inks and the foundation ink used in the printing apparatus of the present embodiment are as follows. These inks each contain a solid component that forms a foundation layer or a color image and a liquid component that volatilizes. Examples of the liquid component include water or a water-soluble organic solvent. As the solid component, the color inks contain a color material which is at least one of a pigment and a dye, and the foundation ink contains at least one of a white pigment and a metallic pigment. Using a white pigment improves the color reproduction of the color inks, and using a metallic pigment provides special glossiness to a printing medium. All of these inks contain water-soluble resin particles for bringing a printing medium and a color material into close contact with each other to improve a print medium’s property against chafing (fixation property).

<Reaction Liquid>

Using a reaction liquid in the printing apparatus of the present embodiment improves fixation of an image printed especially on a low-permeable printing medium or on an impermeable printing medium. Specifically, the reaction liquid used in the present embodiment contains a reactive component that reacts with a pigment or resin particles contained in an ink and coagulates them or turns them into gel. By being mixed, on a printing medium or the like, with an ink containing a pigment which is stably dispersed or dissolved in an aqueous medium due to action of an ionic group, this reactive component can break dispersion stability of the ink. Note that the reaction liquid does not necessarily have to be used in all the printing modes, and only an amount thereof necessary to print an image is applied considering the amount of ink applied.

<Printing Medium>

Examples of the printing medium used in the printing apparatus of the present embodiment include not only paper and the like typically used in printing, but also other media capable of receiving ink, such as a cloth, a plastic film, a metal plate, glass, ceramics, resin, wood, and leather. Specifically, an “impermeable printing medium” can be used, and this refers to a printing medium with no ink permeability for an aqueous ink. Also, a “low-permeable printing medium” refers to a printing medium with lower ink permeability for an aqueous ink than paper and the like typically used. More quantitively, a “low-permeable printing medium” refers to a printing medium having a print surface that absorbs water of 10 $mL/m^2$ or less within 30 msec½ from the start of contact in the Bristow method. The Bristow method is widely used as a method for measuring the amount of liquid absorbed in a short period of time, and is employed in JAPAN TAPPI.

Examples of an impermeable printing medium include ones that are not fabricated as a printing medium for aqueous inks, such as glass, plastic, a film, or yupo paper. The examples further include ones with surfaces that are not processed for printing (have no ink absorption layer formed thereon), e.g., a plastic film or a medium having a base material such as paper coated with plastic. Examples of the plastic include polyvinyl chloride, polyethylene terephthalate, polycarbonate, polystyrene, polyurethane, polyethylene, and polypropylene. Also, examples of the low-permeable printing medium include, e.g., printing media such as actual printing stock used for offset printing or the like, such as art paper and coated paper.

<Printing Method>

Figure 6B:
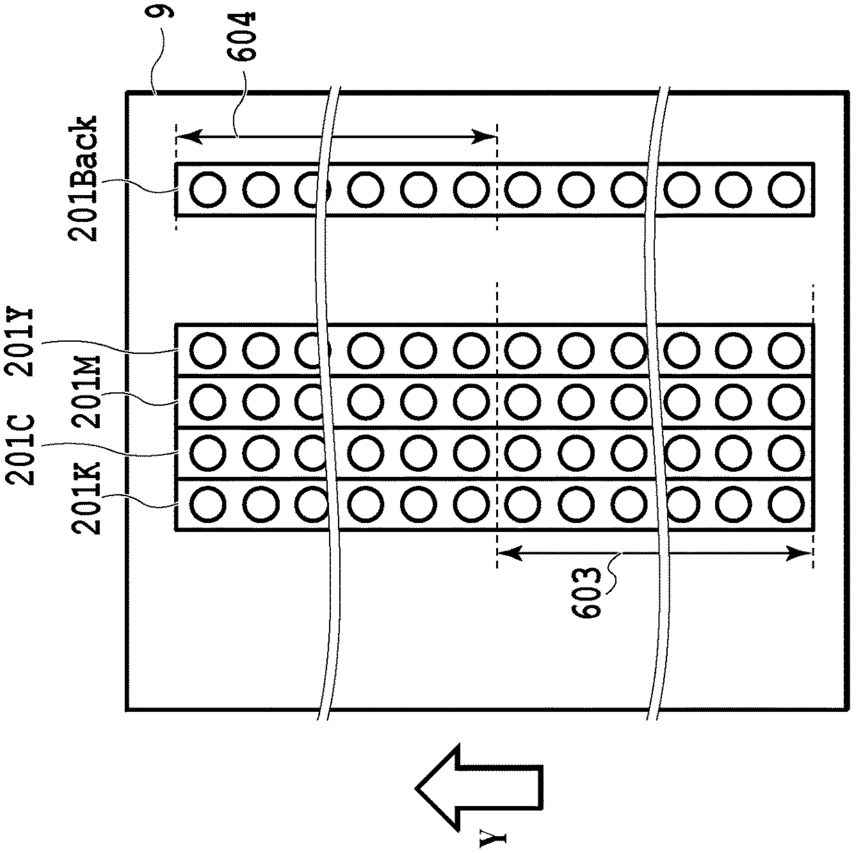
FIGS. 6A and 6B are diagrams showing portions of a printhead having an ejection port array for a foundation ink and ejection port arrays for color inks.
Figure 6A:
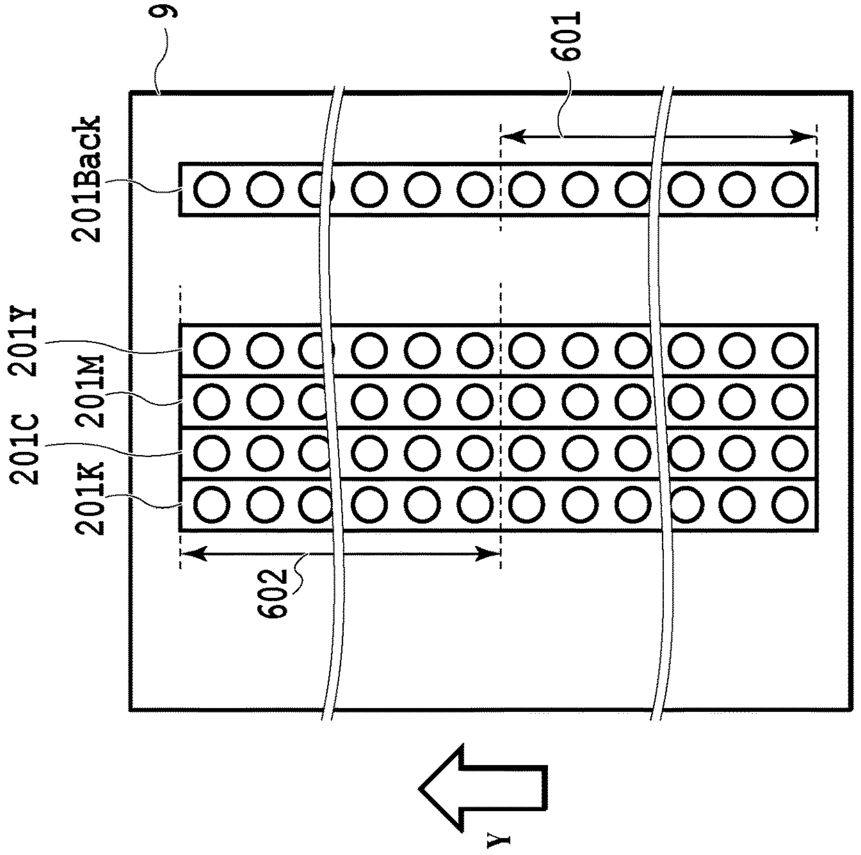

The printing apparatus 100 of the present embodiment is capable of printing an image such that a foundation layer and a color image are stacked together. A description is now given of a specific method for printing the stack portions. FIGS. 6A and 6B are diagrams showing portions of the printhead 9 having the foundation-ink ejection port array 201Back and the color-ink ejection port arrays 201K to 201Y and show the basic printing method of the present embodiment. Specifically, FIG. 6A is a diagram showing a mode where a foundation layer and a color image are stacked in this order on a printing medium (a second mode), and FIG. 6B is a diagram showing a mode where a color image and a foundation layer are stacked in this order on a printing medium (a first mode). The arrowed Y-direction in FIGS. 6A and 6B denotes that a printing medium is conveyed in this direction relative to these ejection port arrays.

As shown in FIG. 6A, to print a foundation layer, an ejection port group 601 located upstream in the printing medium conveyance direction in the foundation-ink ejection port array 201Back is used (in the present example, the ejection port group 601 constitutes half of the total ejection ports). Meanwhile, to print a color image, ejection port groups 602 located downstream in the printing medium conveyance direction in the respective color-ink ejection port arrays 201K, 201C, 201M, and 201Y are used (the ejection port groups 602 too constitute half of the total ejection ports). In this way, the ejection port groups of the foundation-ink ejection port array and the color-ink ejection port arrays are selectively used so as not to overlap in the scanning direction. Thus, a stacked image can be printed without the foundation layer and the color image mixing in the same scan.

In a case where a color image and a foundation layer are stacked in this order on a printing medium, as shown in FIG. 6B, to print the color image, ejection port groups 603 located upstream in the printing medium conveyance direction in the respective color-ink ejection port arrays 201K, 201C, 201M, and 201Y are used. Meanwhile, to print the foundation layer, an ejection port group 604 located downstream in the printing medium conveyance direction in the foundation-ink ejection port array 201Back is used. As a result, in the same manner as described above, a stacked image can be printed without the foundation layer and the color image mixing in the same scan.

Note that it is also possible to stack three or more layers of a foundation layer and a color image. In this case, as described above, the ejection ports are used selectively so that an ejection port group that prints the foundation layer and ejection port groups that print a color image do not overlap in the scanning direction.

In one embodiment of the present disclosure, in the basic printing method described above, a stack region where a color image is stacked and a non-stack region where a color image is not stacked are set in a foundation layer, and ejection ports used to print the stack region and ejection ports used to print the non-stack region are different from each other.

Figure 7A:
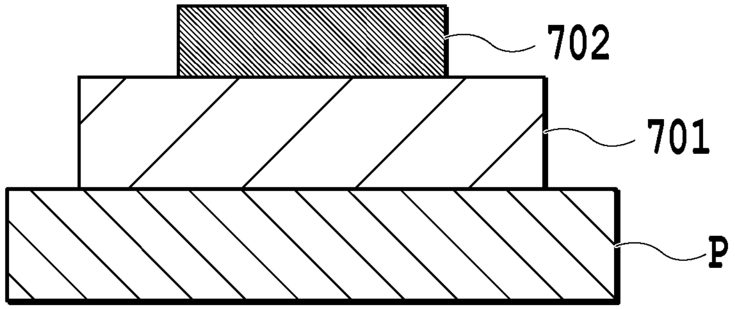
FIGS. 7A and 7B are diagrams illustrating a stack region and a non-stack region between a foundation layer and a color image.
Figure 7B:
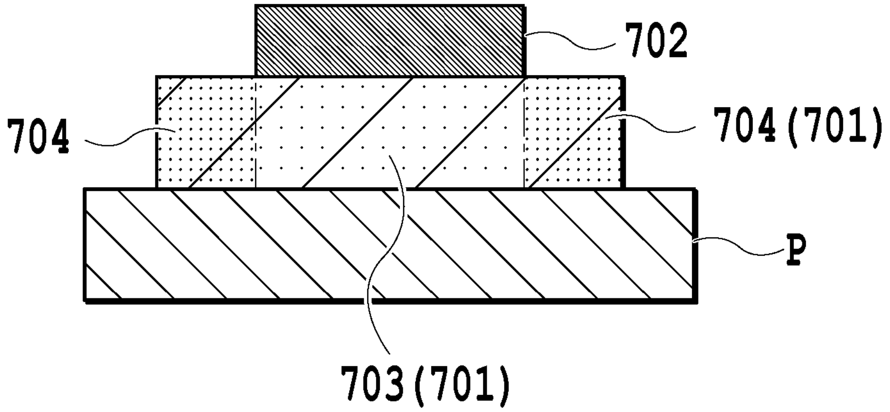

FIGS. 7A and 7B are diagrams illustrating a stack region and a non-stack region between a foundation layer and a color image according to the present embodiment, and show cross sections of the foundation layer and the color image formed on the printing medium P.

As shown in FIG. 7A, as a result of printing, an image is printed with ink layers are stacked on the printing medium P in an order of a foundation layer 701 and a color image 702. As shown in FIG. 7B, in this image, the foundation layer 701 has a region 703 where the color image is stacked and a region 704 where the color image is not stacked. In the present embodiment, the region 703 is called a "stack region," and the region 704 is called a "non-stack region."

Figure 9:
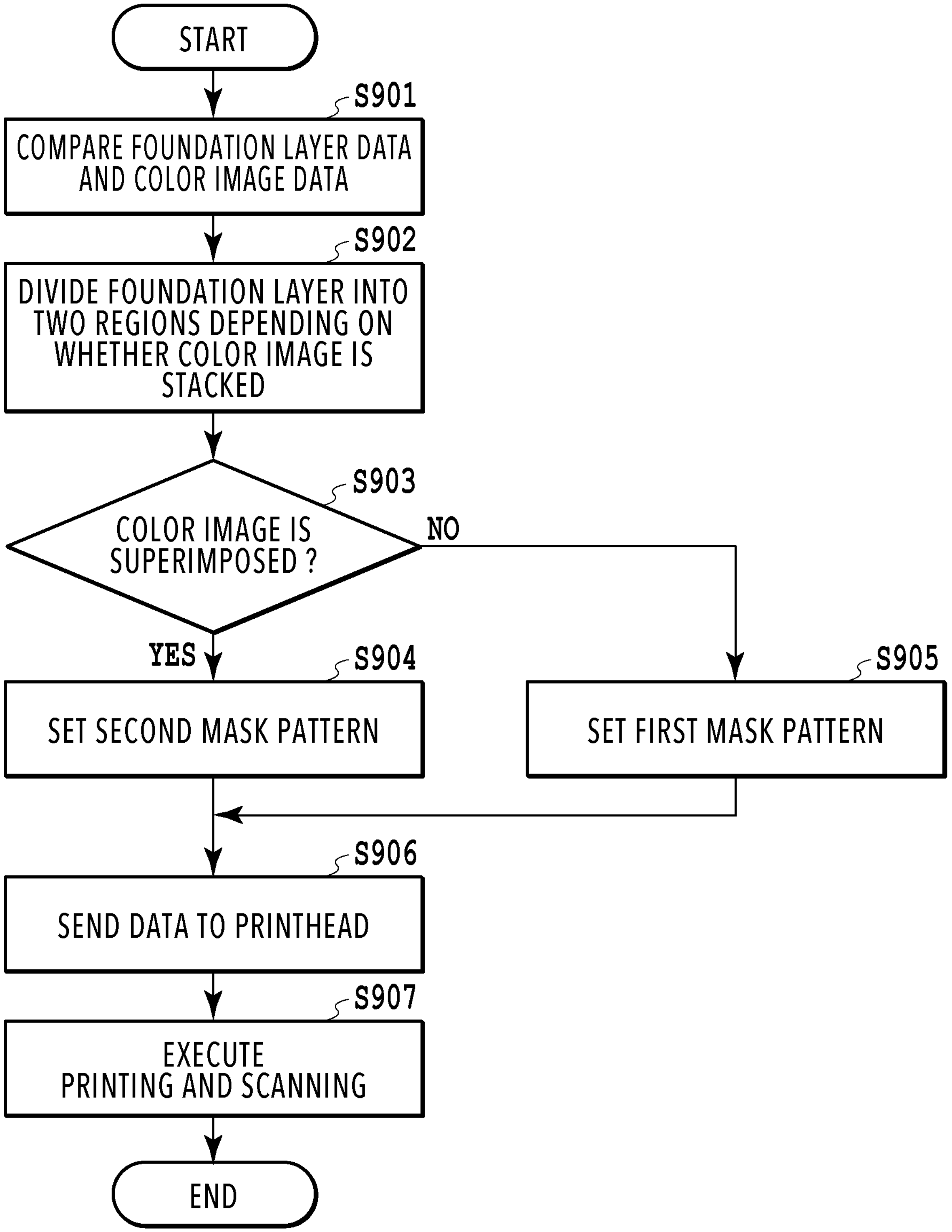
FIG. 9 is a flowchart showing printing processing of the present embodiment including identification of a "stack region" and a "non-stack region" and setting of ejection ports to use based on the identification.

In the present embodiment, depending on the "stack region" and the "non-stack region" of the image, processing to be described later with FIG. 9 is performed. This processing is performed in S404 in FIG. 4 described above after the binary data is obtained by index development processing. Here, the "stack regions" and the "non-stack regions" are identified as a result of a process of superimposing foundation layer data and color-ink print data. Specifically, a pixel in the foundation layer data ("1" data) that has color image data ("1" data) superimposed thereon is a pixel of the "stack region," and a pixel in the foundation layer data ("1" data) that has no color image data ("1" data) superimposed thereon is a pixel of the "non-stack region." Note that this setting processing is not limited to being performed after the binary data is obtained by index development processing. For example, in Step S401, after the RGB data and the foundation layer data are obtained, the RGB data and the foundation layer data may be compared to each other to set the stack and non-stack regions.

Figure 8:
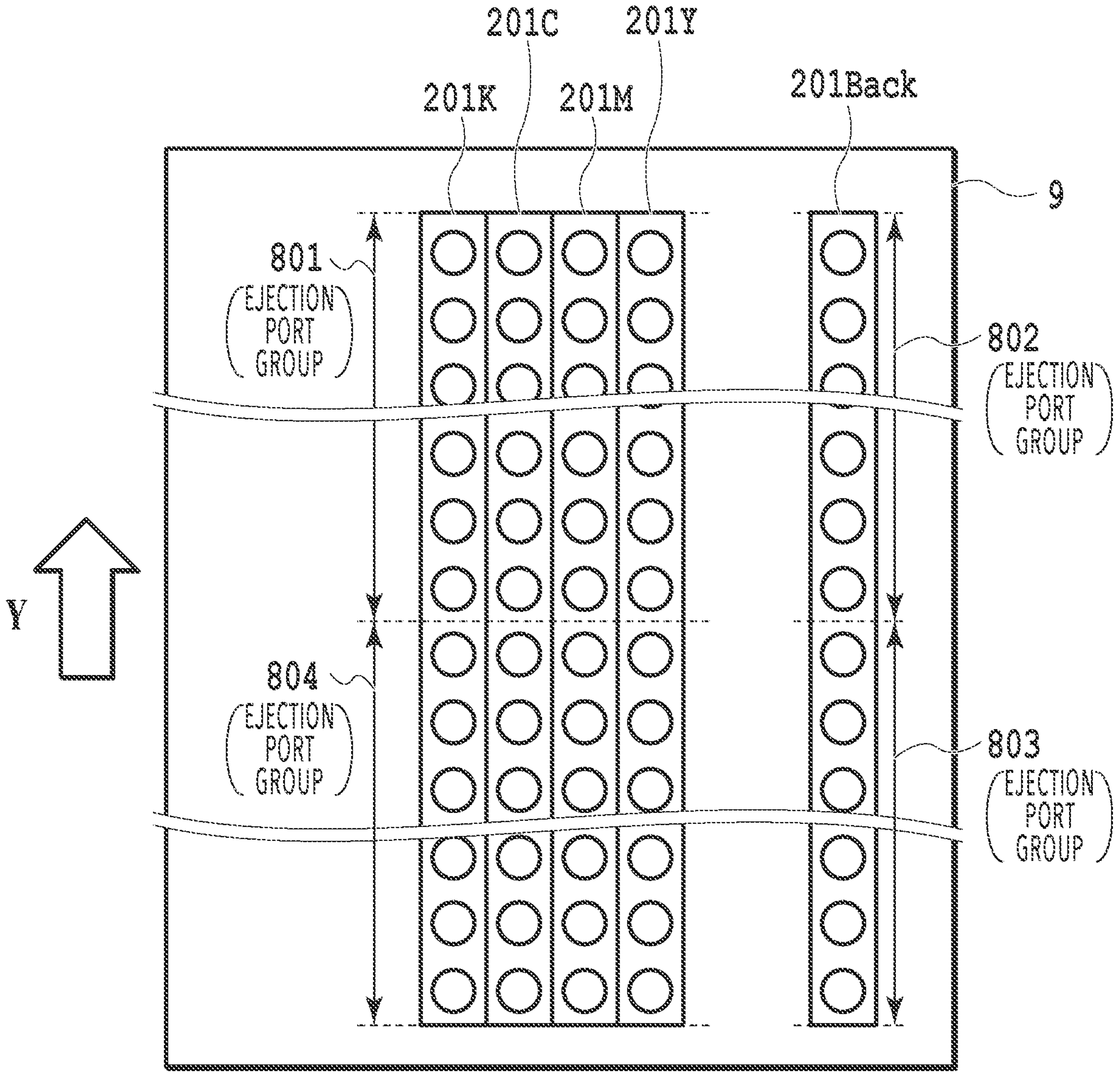
FIG. 8 is a diagram illustrating ejection ports used in ejection port arrays determined depending on the setting of a stack region and a non-stack region.

FIG. 8 is a diagram illustrating ejection ports used in ejection port arrays, defined according to the setting of the stack region and non-stack region described above.

In FIG. 8, to print a color image, in the color-ink ejection port arrays 201 (K, C, M, and Y), first ejection port groups 801 corresponding to ejection ports located downstream in the printing medium conveyance direction (the Y-direction) are used. Meanwhile, to print a stack region of the foundation layer where the color image is stacked, in the foundation-ink ejection port array 201Back, a third ejection port group 803 not overlapping with the first ejection port groups 801 in the printing/scanning direction is used. To print a non-stack region where the color image is not stacked, a second ejection port group 802 overlapping in the printing/scanning direction with (being at the same position in the ejection port arrangement direction as) the first ejection port groups 801 is used.

Setting the ejection ports to use as above can reduce the inequality in the frequency of usage among the ejection ports in the ejection port array for the foundation layer ink and therefore can reduce shortening of the life of the printhead, compared to a case where the foundation layer is printed by the third ejection port group 803 uniformly. Note that the setting of the ejection port group to use for printing is not limited to the above mode, as long as ejection ports other than the third ejection port group 803 are used to print a non-stack region of the foundation layer where the color image is not stacked. This still allows, to some degree or another, reduction in inequality in the frequency of usage among the ejection ports in the foundation-ink ejection port array 201Back. In this case, the ejection ports in the third ejection port group may be used in addition to the ejection ports other than the third ejection port group, or only the ejection ports other than the third ejection port group may be used.

FIG. 9 is a flowchart showing printing processing of the present embodiment including the above-described identification of the "stack regions" and "non-stack regions" and the above-described setting of the ejection ports to use based on the identification.

First, in S901, as described above with e.g. FIGS. 7A and 7B, the CPU 301 compares foundation layer data and color image data. Next, in S902, as described above with e.g. FIG. 8, the CPU 301 identifies, in the foundation layer data, a stack region where the color image data is stacked and a non-stack region where the color image data is not stacked. Next, in S903, the CPU 301 determines whether the foundation layer data overlaps with the color image data. In other words, the CPU 301 determines it is a stack region or a non-stack region. Note that this determination is made for each pixel of the print data obtained by the processing shown in FIG. 4.

If it is determined in S903 that it is a stack region, in S904, the CPU 301 sets a second mask pattern. Also, if it is determined in S903 that it is a non-stack region, in S905, the CPU 301 sets a first mask pattern. Then, using the corresponding masks, the CPU 301 generates print data for each scan. The processing in S904 and S905 will be described later using FIG. 10 and so on. Note that the processing in S904 and S905 corresponds to the processing in S405 in FIG. 4.

Then, in S906, the CPU 301 sends the print data including the mask patterns described above to a printhead control processing unit. Then, masked print data for each scan is generated. Lastly, in S907, the CPU 301 executes scanning and printing.

Figure 10:
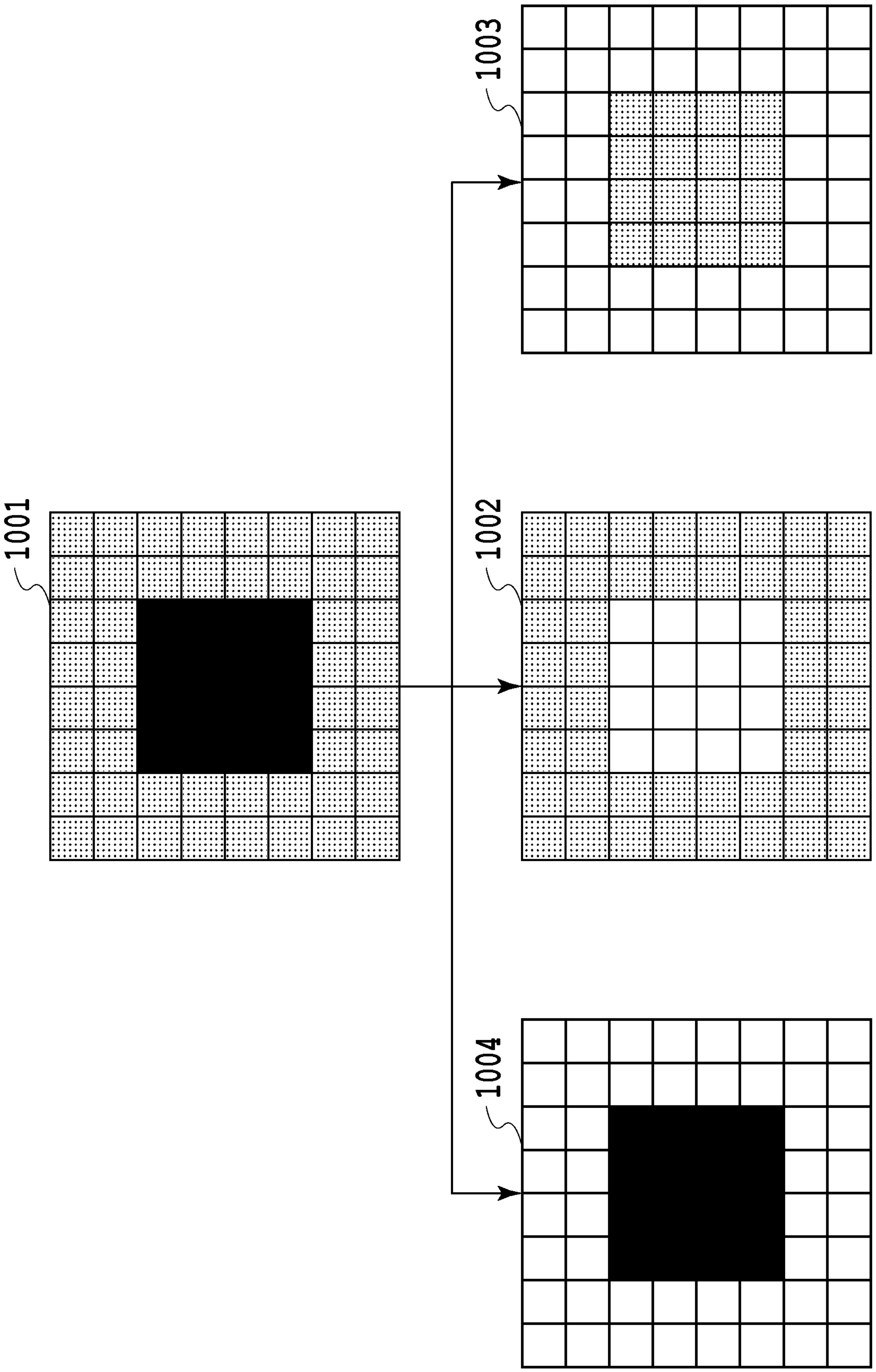
FIG. 10 is a diagram showing pixel-by-pixel foundation layer data and image data according to the setting of mask patterns.

FIG. 10 is a diagram showing foundation layer data and color-image print data on a pixel basis, according to the setting of the mask patterns according to the present embodiment.

FIG. 10 shows print data 1001 on an image in a unit region (8 pixels×8 pixels) on a printing medium, the image having a foundation layer and a color image stacked in this order. Note that the size of a unit region is 8 pixels×8 pixels here to simplify the drawing and illustration. Also, the ranges of ejection ports in and after FIG. 11 correspond to this unit region. In FIG. 10, pixels in black denote pixels where a color image is stacked on a foundation layer, and pixels that are hatched denote pixels with only a foundation layer. The image is printed based on this print data through multi-pass printing. Specifically, as described above with FIG. 8, the use ranges of ejection ports include the first ejection port groups 801, which are half the entire color-ink ejection port arrays and are located downstream in the print medium conveyance direction. Also, the third ejection port group 803 is half the entire foundation-ink ejection port array and is located upstream in the printing medium conveyance direction. The second ejection port group 802 is a range in the foundation-ink ejection port array excluding the third ejection port group. In this case, multi-pass printing is performed with ejection ports in each of four equal ranges in each ejection port array while a printing medium is conveyed after each scan by a distance corresponding to a quarter of the ejection port array, and printing of the unit region described above is completed by four scans. Then, a non-stack region 1002 and a stack region 1003 are distinguishingly set in the foundation layer data in the print data 1001 as a result of a comparison between the foundation layer data and the image data described above.

Figure 11:
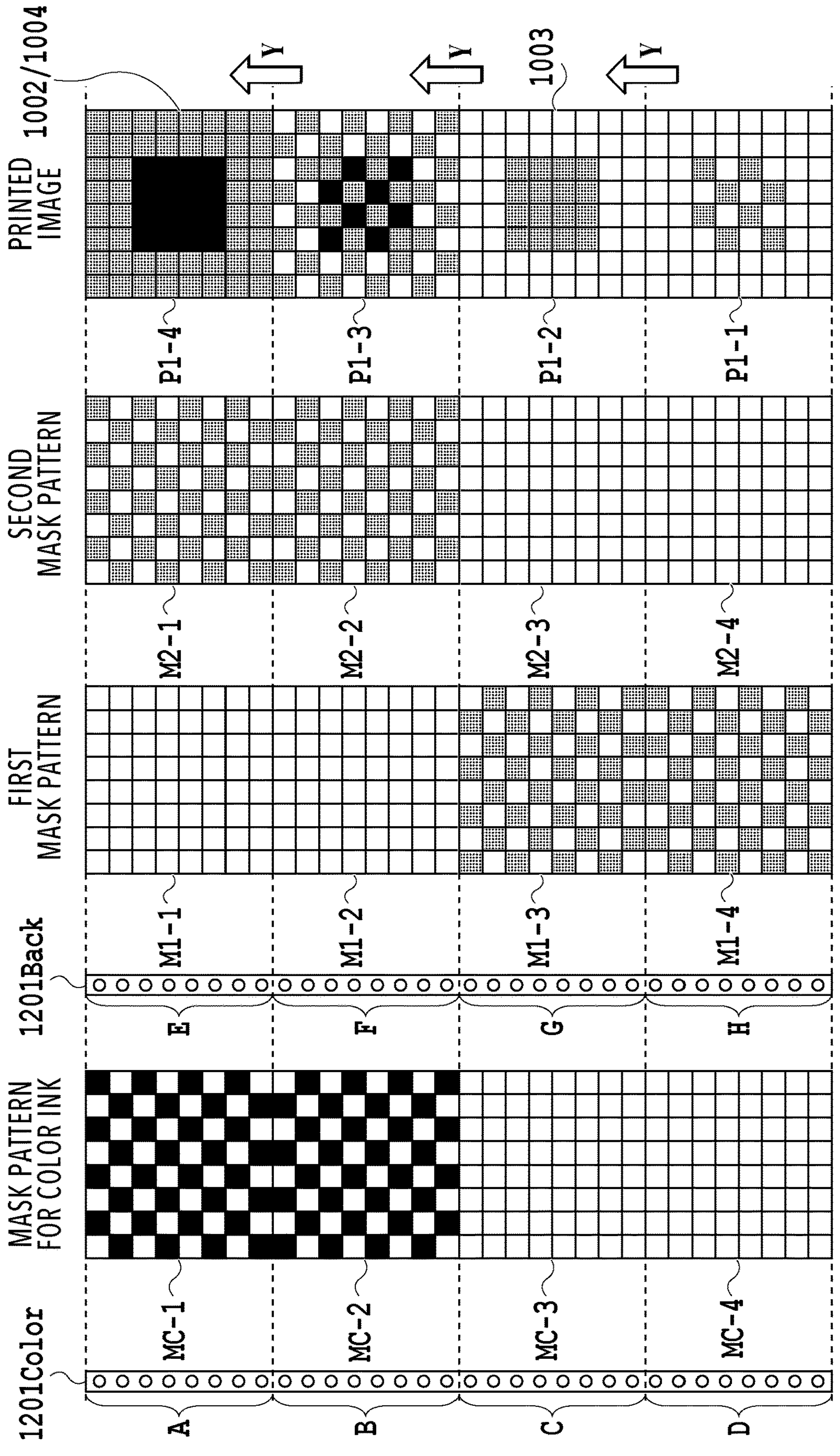
FIG. 11 is a diagram showing the relations between mask patterns and the ejection ports of the color-ink ejection port arrays and of the foundation-ink ejection port array.

FIG. 11 is a diagram showing the relations between the mask patterns and ejection ports of a color-ink ejection port array 1201Color and of a foundation-ink ejection port array 1201Back in a case where print data described above with FIG. 10 is printed with four scans.

The mask patterns in FIG. 11 each have areas of 8 pixels×8 pixels, corresponding to the unit region described above with FIG. 10. FIG. 11 shows a mask pattern for a color ink and first and second mask patterns for a foundation ink. In each mask pattern, areas in black denote areas where printing (ejection) of the color ink is permitted, and areas that are hatched denote areas where printing (ejection) of the foundation ink is permitted. Also, in all the mask patterns, areas in white denote areas where printing of the ink is not permitted (the ink is not ejected).

In a case of performing multi-pass printing with four scans, 32 ejection ports of the color-ink ejection port array 1201Color are divided into ejection port groups A to D each having eight ejection ports. The first ejection port group described above corresponds to the ejection port groups A and B. Similarly, the foundation-ink ejection port array 1201Back is divided into ejection port groups E to H. The second ejection port group described above corresponds to the ejection port groups E and F, and the third ejection port group described above corresponds to the ejection port groups G and H.

Then, the ejection port groups A to D of the color-ink ejection port array 1201Color are associated with mask regions MC-1 to MC-4, respectively, to perform the printing with the first ejection port group. As a result, the ejection port groups A and B print images that complement each other, and the ejection port groups C and D do not print any image. Meanwhile, for the foundation-ink ejection port array 1201Back, the first mask pattern or the second mask pattern is associated depending on whether the color image is stacked (Steps S904 and S905 in FIG. 9). In the first mask pattern for stack regions, mask regions M1-1 to M1-4 are associated with the ejection port groups E to H, respectively. Thus, the ejection port groups G and H print images that complement each other, and the ejection port groups E and F do not print any image. Also, in the second mask pattern for non-stack regions, mask regions M2-1 to M2-4 are associated with the ejection port groups E to H, respectively. Thus, the ejection port groups E and F print images that complement each other, and the ejection port groups G and H do not print any image.

With the mask pattern and the ejection ports of the ejection port array thus associated with each other, a color ink image is printed as follows: color image data 1004 is masked with the mask regions MC-1 to MC-4, and ink is ejected only for pixels overlapping with the print-permitted pixels of the mask pattern. Similarly, a foundation layer is printed with the stack region 1003 of the foundation layer data being masked by the mask regions M1-1 to M1-4 of the first mask pattern. Also, the foundation layer is printed with the non-stack region 1002 being masked by the mask regions M2-1 to M2-4 of the second mask pattern.

Ejection ports to use in each of the four scans are defined to complete printing using the mask patterns described above, and thus, printing is performed with four scans based on print data. As shown at the right end of FIG. 11, first, in the first scan, the ejection port group H for the foundation ink is used to print an image P1-1 based on print data generated by the mask region M1-4 of the first pattern. After this scan, the printing medium P is conveyed in the Y-direction by a distance corresponding to the unit region (the band width). Then, in the second scan, the ejection port group G for the foundation ink is used to print an image based on print data generated by the mask region M1-3 of the first mask pattern. As a result, an image P1-2 where the above image complements the image P1-1 is printed. This image corresponds to the stack region 1003 (FIG. 10). After the printing medium is conveyed in the Y-direction similarly, in the third scan, the ejection port group F for the foundation ink is used to print an image based on print data on the foundation ink generated by the mask region M2-2 of the second mask pattern, and in the same scan, the ejection port group B for the color ink is used to print an image based on color ink print data generated by the mask region MC-2 of the mask pattern for the color ink. As a result, part of the color ink image is applied on top of the stack region, and the foundation ink is applied to the non-stack region therearound. Similarly, in the fourth scan, the ejection port group E for the foundation ink is used to print an image based on foundation-ink print data generated by the mask region M2-1 of the second mask pattern, and in the same scan, the ejection port group A for the color ink is used to print an image based on color-ink print data generated by the mask region MC-1 of the mask pattern for the color ink. As a result, a color-ink image is complementarily applied on top of the stack region, and a foundation-ink image is complementarily applied to the non-stack region therearound. These complemented images correspond to the color image data 1004 and the non-stack region 1002 shown in FIG. 10, respectively.

Note that the above-described correspondences between the first to fourth ejection port groups and the actual ranges of the ejection ports in the ejection port arrays are not limited to the example described above. The correspondences can be defined at will according to the inks used, the size of the unit region, or the like as long as their relative positional relations are maintained.

As thus described, in the present embodiment, ejection ports used to print a non-stack region of the foundation layer where the color image is not stacked and ejection ports used to print a stack region of the foundation layer are different. This reduces the inequality in the frequency of usage among the ejection ports of the foundation-ink ejection port array and consequently can reduce shortening of the life of the printhead.

Figure 12A:
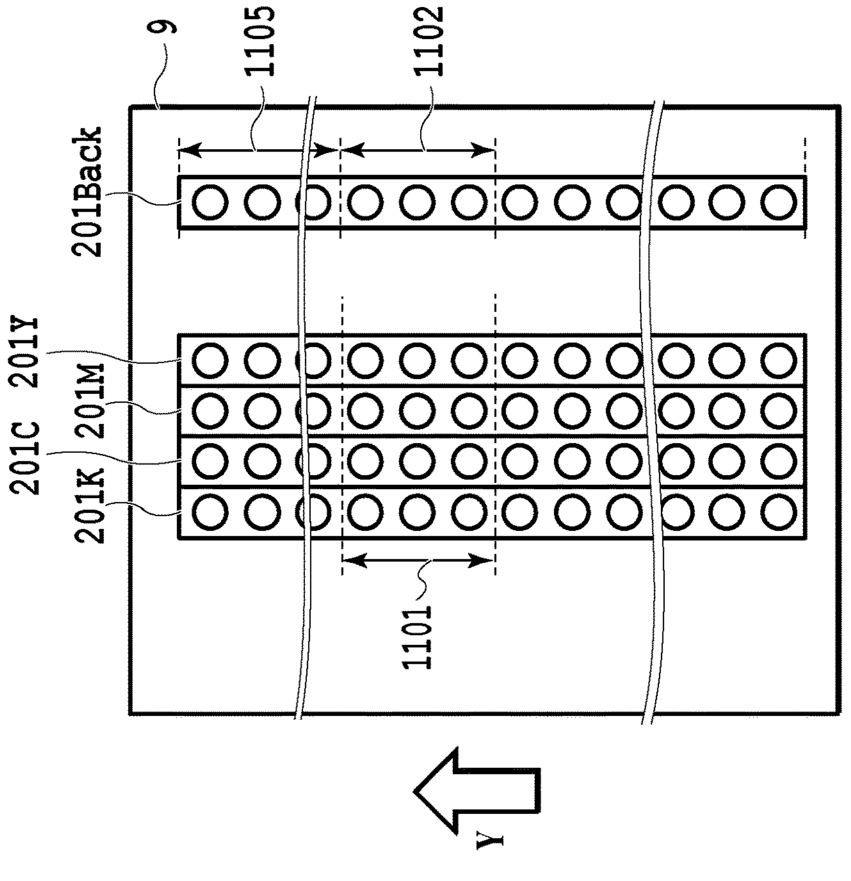
FIGS. 12A and 12B are diagrams showing the use ranges of ejection ports for the foundation ink and of ejection ports for the color inks.
Figure 12B:
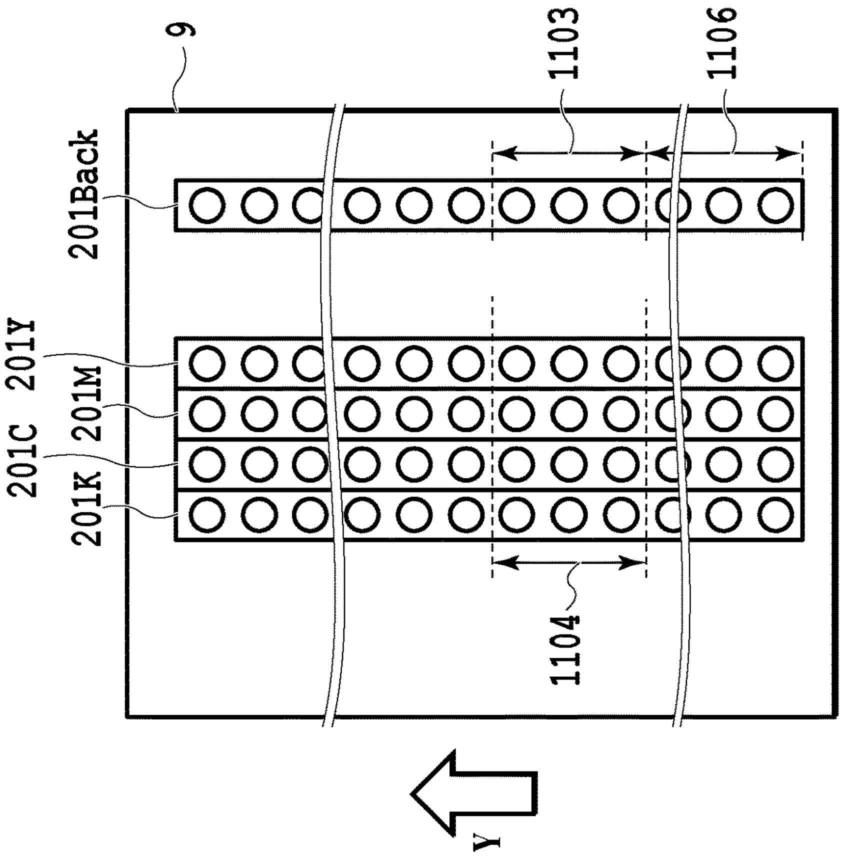

FIGS. 12A and 12B are diagrams showing the use ranges of the ejection ports for the foundation ink and those of the ejection ports for the color ink according to a modification of the first embodiment and show contents similar to those in FIGS. 6A and 6B.

In the example described above with FIGS. 6A and 6B, the ejection port groups (602, 603) used to print a color image are located at end portions of the ejection port arrays. The present modification relates to a case where those ejection port groups are not located at end portions.

As shown in FIG. 12A, in a case where a foundation layer and a color image are stacked in this order on a printing medium, a color image is printed by first ejection port groups 1101 not located at end portions of the ejection port arrays. In this case, the foundation layer is printed by, in the foundation-ink ejection port array 201Back, a second ejection port group 1102 and an ejection port group 1105 which is located more downstream in the printing medium conveyance direction than the first ejection port groups 1101. Also, as shown in FIG. 12B, in a case where a color image and a foundation layer are stacked in this order on a printing medium, the foundation layer is printed by, in the foundation-ink ejection port array 201Back, a third ejection port group 1103 and an ejection port group 1106 which is located more upstream in the printing medium conveyance direction than fourth ejection port groups 1104 used to print the color image.

Second Embodiment

In the first embodiment described above, a non-stack region of a foundation layer where a color image is not stacked is printed only by an ejection port group other than the third ejection port group. In the present embodiment, part of the third ejection port group is used to print a non-stack region. In addition, each ejection port group's usage frequency is set based on the ratio of the area of a non-stack region and the area of a stack region. This enables further reduction of shortening of the life of the printhead. The following description omits detailed descriptions of configurations that are similar to those in the first embodiment.

Figure 13A:
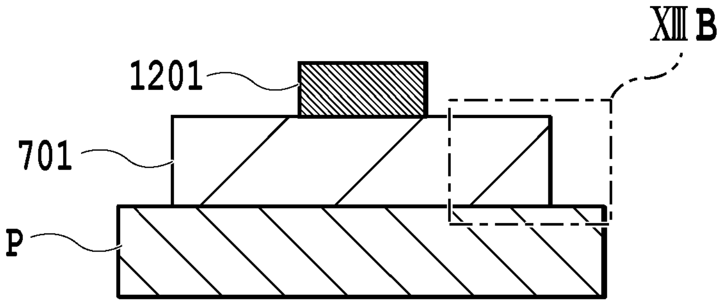
FIGS. 13A and 13B are diagrams illustrating a stack region and a non-stack region between a foundation layer and a color image.
Figure 13B:
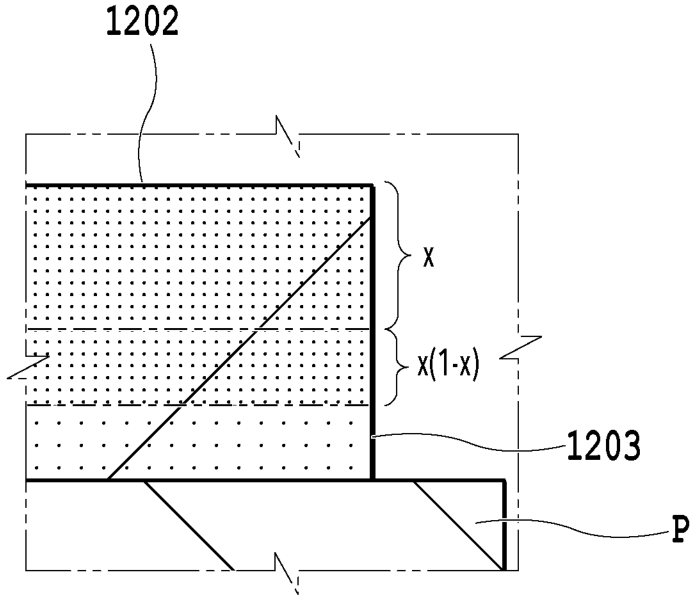

FIGS. 13A and 13B are diagrams illustrating a stack region and a non-stack region between a foundation layer and a color image according to the present embodiment and show contents similar to those in FIGS. 7A and 7B for the first embodiment. FIGS. 13A and 13B show cross sections of a foundation layer and a color image formed on the printing medium P, and FIG. 13B shows a close-up of a portion XIIIB in FIG. 13A. FIGS. 13A and 13B show an example where the foundation layer 701 and a color image 1201 are stacked on the printing medium P, the color image 1201 having an area which is one third of the foundation layer (as seen from above in FIGS. 13A and 13B). Also, the third ejection port group 803 (FIG. 8) is located upstream in the printing medium conveyance direction and is half the length of the entire foundation-ink ejection port array, and the second ejection port group 802 (FIG. 8) is a part of the foundation-ink ejection port array excluding the third ejection port group.

In the above example, the ratio of the area of non-stack region to the foundation layer is ⅔. Also, the ratio of the length of the second ejection port group to the total length of the foundation-ink ejection port array (a second ejection port group ratio) is ½. Thus, in this case, in a case where the ratio of the area of non-stack region to the foundation layer is larger than the second ejection port group ratio, if the non-stack region of the foundation layer is printed only by the second ejection port group, the second ejection port group is used more frequently than the third ejection port group that prints the stack region of the foundation layer. Thus, the amounts of ink applied by the second ejection port group and by the third ejection port group are adjusted as will be described below.

Specifically, in the close-up view shown in FIG. 13B, the second ejection port group applies an amount 1202 obtained by multiplying the final amount of the foundation ink to be applied per unit region by the following value. Then, the third ejection port group applies a remaining ink amount 1203.

$x+x(1-x)=2x-x^2$, where $x$ is the second ejection port group ratio.

By thus adjusting the usage frequencies, the difference in usage frequency between the second and third ejection port groups is reduced, so that shortening of the life of the printhead can further be reduced compared to a case where a non-stack region of the foundation layer where a color image is not stacked is printed only by the second ejection port group.

Note that the lengths and positions of the ejection port groups described above are mere examples and can be defined at will as long as the relative positional relations are maintained.

Third Embodiment

The first and second embodiments described above relate to reducing shortening of the life of the ejection port array for printing a foundation ink. However, the fact that using some ejection ports more than others in multi-layer printing shortens the life of the printhead also applies to ejection port arrays for printing color inks. For example, in a case where a transparent printing medium is used, printing a color ink on top of a foundation layer enables the color image to be visible only from one side of the printing medium. In order for the color image to be visible from both sides of a printing medium, the color image is printed without the foundation layer printed. In this case, an ejection port group used in the ejection port array for printing a color ink can be set without being bound by its relation to the ejection port group used in the ejection port array for printing the foundation ink. Thus, shortening of the life can be reduced by appropriately setting the ejection port group to use for a region where a color image is printed without a foundation layer being stacked.

Figure 14A:
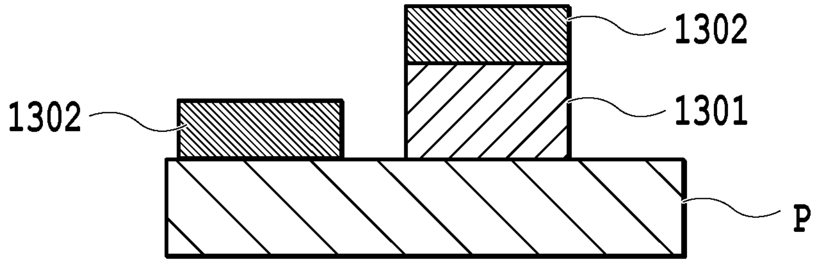
FIGS. 14A and 14B are diagrams illustrating a stack region and a non-stack region between a foundation layer and a color image.
Figure 14B:
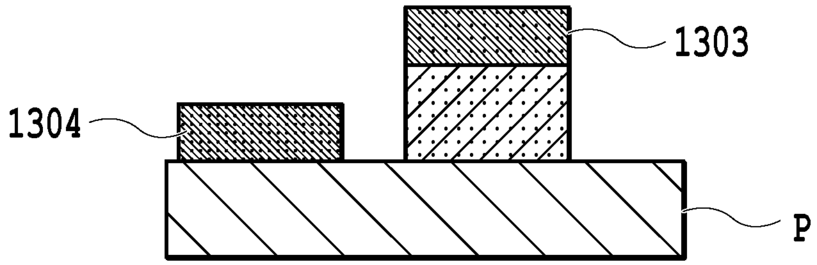

FIGS. 14A and 14B are diagrams illustrating a stack region and a non-stack region between a foundation layer and a color image according to a third embodiment of the present embodiment.

In FIG. 14A, a foundation layer 1301 and a color image 1302 are printed on the printing medium P. In the present embodiment, as shown in FIG. 14B, in this image, a stack region 1303 where the color image and the foundation layer are stacked and a non-stack region 1304 where they are not stacked are set. These regions are set in the same manner as described in the first embodiment.

With reference to FIG. 8, the ranges of the ejection ports of the ejection port arrays used for the stack region and those used for the non-stack region are as follows. For the stack region 1303 in FIG. 14B, the first ejection port groups 801 of the color-ink ejection port arrays 201K to 201Y located downstream in the printing medium conveyance direction are used to print the color image, and the third ejection port group 803 in the foundation-ink ejection port array not overlapping with the first ejection port groups in the printing scanning direction is used to print the foundation layer. As a result of this, a stack image can be printed without the foundation layer and the color image mixing with each other because there is no overlap in the printing scanning direction between the ejection port groups used. Meanwhile, for the region 1304 where only the color layer is printed, not the first ejection port groups 801 used for the region 1303 but fourth ejection port groups 804 overlapping with the third ejection port group are used. This can reduce inequality in the usage frequency within the color-ink ejection port arrays and therefore can reduce shortening of the life of the printhead, compared to a case where the color layer is printed uniformly by the first ejection port groups 801. Note that as described in the first embodiment, the setting of the ejection port groups to use for printing is not limited to what is described above. The region setting method and the printing method are not described in detail here because they are the same as the first embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-203744, filed Dec. 20, 2022, which is hereby incorporated by reference herein in its entirety.

What is claimed is:

1. A printing apparatus comprising:

a conveyance unit configured to convey a printing medium;

a printing unit comprising (1) a first ejection port array in which a plurality of ejection ports for ejecting a first ink are arranged in a conveyance direction in which the printing medium is conveyed and (2) a second ejection port array in which a plurality of ejection ports for ejecting a second ink different from the first ink are arranged in the conveyance direction, the first ejection port array and the second ejection port array being arranged in a predetermined direction intersecting with the conveyance direction, the printing unit being configured to print an image by scanning over the printing medium in a direction along the predetermined direction; and a control unit configured to perform control to print (1) an image of a foundation layer, (2) an image in a stack region, and (3) an image in a non-stack region on the printing medium by causing the conveyance unit to convey the printing medium while causing the printing unit to perform the scanning, wherein in the printing unit, (1) an ejection port group in the first ejection port array used to print the image of the foundation layer, (2) an ejection port group in the second ejection port array used to print the image in the stack region stacked on the foundation layer, and (3) an ejection port group in the second ejection port array used to print the image in the non-stack region not stacked on the foundation layer are set, wherein the image in the stack region and the image in the non-stack region are a color image, wherein the control unit performs control so that in printing of the image in the non-stack region, the image of the foundation layer is printed using an ejection port group in the first ejection port array which is located at a same position as an ejection port group in the second ejection port array for printing the image in the non-stack region, in a direction in which the ejection ports of the first ejection port array are arranged, and wherein in a case where the control unit performs the control so that in printing of the color image, the image of the foundation layer is printed while using a first ejection port group in the second ejection port array which is a selectively used ejection port group, the control unit performs the control so that at least part of a second ejection port group in the first ejection port array is used to print the image of the foundation layer in the non-stack region, the second ejection port group being an ejection port group located at a same position as the first ejection port group in the direction in which the ejection ports of the first ejection port array are arranged.

2. The printing apparatus according to claim 1, wherein in printing of the image of the foundation layer in the non-stack region, the control unit performs the control so that at least part of a third ejection port group in the first ejection port array is used, the third ejection port group being other than the second ejection port group.

3. The printing apparatus according to claim 1, wherein in printing of the image of the foundation layer in the stack region, the control unit performs the control so that a third ejection port group is used.

4. The printing apparatus according to claim 1, wherein in printing of the image of the foundation layer in the non-stack region, the control unit performs the control so that the second ejection port group is used and a third ejection port group is not used.

5. The printing apparatus according to claim 1, wherein in a first mode where the color image is printed using the first ejection port group in the second ejection port array, the control unit performs the control so that the second ejection port group is used in printing of the image of the foundation layer in the non-stack region, and wherein in a second mode where the color image is printed using a fourth ejection port group in the second ejection port array different from the first ejection port group, the control unit performs the control so that a third ejection port group in the first ejection port array is used in printing of the image of the foundation layer in the non-stack region, the third ejection port group being an ejection port group located at a same position as the fourth ejection port group in the direction in which the ejection ports of the first ejection port array are arranged.

6. The printing apparatus according to claim 5, wherein in the first mode, an image in which the color image and the foundation layer are stacked in this order on the printing medium is printed, and wherein in the second mode, an image in which the foundation layer and the color image are stacked in this order on the printing medium is printed.

7. The printing apparatus according to claim 5, wherein in the first mode, in a case where an area ratio of the non-stack region to the foundation layer is larger than a second ejection port group ratio which is a ratio of a length of the second ejection port group to a total length of the first ejection port array, the control unit performs the control such that, for the non-stack region of the foundation layer, the ejection ports of the second ejection port group apply an ink amount obtained by multiplying a final amount of ink to be applied by a ratio which is a sum of the second ejection port group ratio and a ratio obtained by multiplying the second ejection port group ratio by a value obtained by subtracting the second ejection port group ratio from 1 and the ejection ports of the third ejection port group apply a remaining ink amount.

8. The printing apparatus according to claim 5, wherein in the second mode, in a case where an area ratio of the non-stack region to the foundation layer is larger than a third ejection port group ratio which is a ratio of a length of the third ejection port group to a total length of the first ejection port array, the control unit performs the control such that, for the non-stack region of the foundation layer, the ejection ports of the third ejection port group apply an ink amount obtained by multiplying a final amount of ink to be applied by a ratio which is a sum of the third ejection port group ratio and a ratio obtained by multiplying the third ejection port group ratio by a value obtained by subtracting the third ejection port group ratio from 1 and the ejection ports of the second ejection port group apply a remaining ink amount.

9. The printing apparatus according to claim 1, wherein the ink used to print the image of the foundation layer contains at least one of a white pigment and a metallic pigment, and wherein the ink used to print the color image contains a color material which is at least one of a pigment and a dye.

10. The printing apparatus according to claim 1, wherein in a case where the control unit performs the control so that in printing of the color image, the image of the foundation layer is printed while using a third ejection port group in the first ejection port array which is a selectively used ejection port group, the control unit performs the control so that at least part of a fourth ejection port group in the second ejection port array is used to print the color image in the non-stack region, the fourth ejection port group being an ejection port group located at a same position as the third ejection port group in the direction in which the ejection ports of the second ejection port array are arranged.

11. A method for controlling a printing apparatus, the method comprising:

conveying a printing medium; and performing control to print (1) an image of a foundation layer, (2) an image in a stack region, and (3) an image in a non-stack region on the printing medium by conveying the print medium in the conveying while scanning a printing unit over the printing medium in a direction along a predetermined direction intersecting with a conveyance direction in which the printing medium is conveyed, the printing unit including (1) a first ejection port array in which a plurality of ejection ports for ejecting a first ink are arranged in the conveyance direction and (2) a second ejection port array in which a plurality of ejection ports for ejecting a second ink different from the first ink are arranged in the conveyance direction, the first ejection port array and the second ejection port array being arranged in the predetermined direction, wherein in the printing unit, (1) an ejection port group in the first ejection port array used to print the image of the foundation layer, (2) an ejection port group in the second ejection port array used to print the image in the stack region stacked on the foundation layer, and (3) an ejection port group in the second ejection port array used to print the image in the non-stack region not stacked on the foundation layer are set, wherein the image in the stack region and the image in the non-stack region are a color image, wherein in the performing control, control is performed so that in printing of the image in the non-stack region, the image of the foundation layer is printed using an ejection port group in the first ejection port array which is located at a same position as an ejection port group in the second ejection port array for printing the image in the non-stack region, in a direction in which the ejection ports of the first ejection port array are arranged, and wherein in a case where the control is performed so that in printing of the color image, the image of the foundation layer is printed while using a first ejection port group in the second ejection port array which is a selectively used ejection port group, the control is performed so that at least part of a second ejection port group in the first ejection port array is used to print the image of the foundation layer in the non-stack region, the second ejection port group being an ejection port group located at a same position as the first ejection port group in the direction in which the ejection ports of the first ejection port array are arranged.

12. A non-transitory computer-readable storage medium storing a program for causing a printing apparatus to function as a plurality of units comprising:

a conveying unit configured to convey a printing medium; and a control unit configured to perform control to print (1) an image of a foundation layer, (2) an image in a stack region, and (3) an image in a non-stack region on the printing medium by causing the conveyance unit to convey the print medium while scanning a printing unit over the printing medium in a direction along a predetermined direction intersecting with a conveyance direction in which the printing medium is conveyed, the printing unit including (1) a first ejection port array in which a plurality of ejection ports for ejecting a first ink are arranged in the conveyance direction and (2) a second ejection port array in which a plurality of ejection ports for ejecting a second ink different from the first ink are arranged in the conveyance direction, the first ejection port array and the second ejection port array being arranged in the predetermined direction, wherein in the printing unit, (1) an ejection port group in the first ejection port array used to print the image of the foundation layer, (2) an ejection port group in the second ejection port array used to print the image in the stack region stacked on the foundation layer, and (3) an ejection port group in the second ejection port array used to print the image in the non-stack region not stacked on the foundation layer are set, wherein the image in the stack region and the image in the non-stack region are a color image, wherein the control unit performs the control so that in printing of the image in the non-stack region, the image of the foundation layer is printed using an ejection port group in the first ejection port array which is located at a same position as an ejection port group in the second ejection port array for printing the image in the non-stack region, in a direction in which the ejection ports of the first ejection port array are arranged, and wherein in a case where the control unit performs the control so that in printing of the color image, the image of the foundation layer is printed while using a first ejection port group in the second ejection port array which is a selectively used ejection port group, the control unit performs the control so that at least part of a second ejection port group in the first ejection port array is used to print the image of the foundation layer in the non-stack region, the second ejection port group being an ejection port group located at a same position as the first ejection port group in the direction in which the ejection ports of the first ejection port array are arranged.

13. A printing apparatus comprising:

a conveyance unit configured to convey a printing medium;

a printing unit including (1) a first ejection port array in which a plurality of ejection ports for ejecting a first ink are arranged in a conveyance direction in which the printing medium is conveyed and (2) a second ejection port array in which a plurality of ejection ports for ejecting a second ink different from the first ink are arranged in the conveyance direction, the first ejection port array and the second ejection port array being arranged in a predetermined direction intersecting with the conveyance direction, the printing unit being configured to print an image by scanning over the printing medium in a direction along the predetermined direction; and a control unit configured to perform control to print (1) an image of a foundation layer, (2) an image in a stack region, and (3) an image in a non-stack region on the printing medium by causing the conveyance unit to convey the printing medium while causing the printing unit to perform the scanning, wherein in the printing unit, (1) an ejection port group in the first ejection port array used to print the image of the foundation layer, (2) an ejection port group in the second ejection port array used to print the image in the stack region stacked on the foundation layer, and (3) an ejection port group in the second ejection port array used to print the image in the non-stack region not stacked on the foundation layer are set, wherein the image in the stack region and the image in the non-stack region are a color image, and wherein the control unit performs control so that in printing of the image in the non-stack region, the image of the foundation layer is printed using an ejection port group in the first ejection port array which is located at a same position as an ejection port group in the second ejection port array for printing the image in the non-stack region, in a direction in which the ejection ports of the first ejection port array are arranged, and wherein in a case where the control unit performs the control so that in printing of the color image, the image of the foundation layer is printed while using a third ejection port group in the first ejection port array which is a selectively used ejection port group, the control unit performs the control so that at least part of a fourth ejection port group in the second ejection port array is used to print the color image in the non-stack region, the fourth ejection port group being an ejection port group located at a same position as the third ejection port group in the direction in which the ejection ports of the second ejection port array are arranged.

* * * * *